Dec. 24, 1968    L. B. DAMON    3,417,470

HEDGE TRIMMER

Filed Sept. 26, 1967

INVENTOR.
LEON B. DAMON.
BY James N. Lyles
John H. Oltman
ATT'YS.

United States Patent Office 3,417,470
Patented Dec. 24, 1968

3,417,470
HEDGE TRIMMER
Leon B. Damon, 3405 SW. 44th St.,
Fort Lauderdale, Fla. 33312
Filed Sept. 26, 1967, Ser. No. 670,660
1 Claim. (Cl. 30—276)

ABSTRACT OF THE DISCLOSURE

The invention is a cutting apparatus such as a hedge trimmer having two handles enabling the apparatus to be manipulated manually and which is stopped automatically if either of the handles is released. The apparatus includes a frame on which an electric motor is mounted, a blade driven by the motor, and means connected to the motor for supplying energizing power thereto. A pair of handles is affixed to the frame, and one electrical switch is mounted on each of the handles and is electrically connected to the motor so that both switches must be operated in order to operate the motor. Each switch has an actuator adapted to be operated by the operator when he grasps the associated handle. Thus, when the operator grasps both handles, he can depress both actuators to start the motor. If either handle is released, such as by dropping one handle, the associated switch is de-activated and the motor stops, thus stopping the blade. The motor has brakes for immediately stopping the blade as soon as the motor stops.

Background of the invention

There are many types of hedge trimmers and similar cutting apparatus for cutting bushes or the like. Such apparatus is adapted to be carried or manipulated manually in accomplishing the cutting. If the operator should accidentally drop the apparatus, or at least drop one handle of the apparatus, the apparatus keeps running and may easily injure the operator. There has been a need for a safety device for such cutting apparatus which would stop it automatically when it is partially or completely dropped.

Accordingly, it is an object of the invention to provide a cutting apparatus with a safety disconnect device which will automatically stop the apparatus if it is dropped or partially released.

Another object of the invention is to provide a cutting apparatus having two handles with means on each handle adapted to stop the cutting apparatus if either handle is released.

Another object of the invention is to provide a motor driven cutting apparatus having handles for manipulating the same with an electrical switch on each handle electrically connected to the motor of the apparatus so that both switches must be operated to operate the apparatus and if either switch is de-actuated the apparatus will stop.

Another object is to provide actuators for the switches just referred to adapted to be grasped and operated by the operator as he grasps the handles of the apparatus.

Summary of the invention

The cutting apparatus of the invention includes a frame having a cutting blade and a motor for driving the blade mounted thereon, with handles affixed to the frame so that the frame and attachments thereto can be lifted and manipulated by grasping the handles. Each handle has an electrical switch mounted thereon, the two switches being electrically connected to the motor so that both switches must be actuated to start the motor, and if either switch is de-activated the motor will stop. Each switch has an actuator which is mounted so that it can be grasped as the operator grasps the handle so that no manipulation other than grasping the handle and actuator is needed in order to operate the apparatus.

On the drawings

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings

Figure 1:
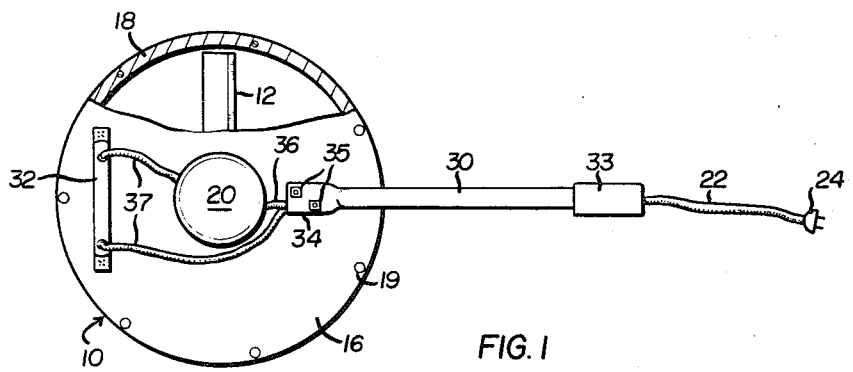
FIGURE 1 is a plan view of a cutting apparatus in accordance with one embodiment of the invention, the housing of the apparatus being partially broken away to reveal the cutting blade.
Figure 2:
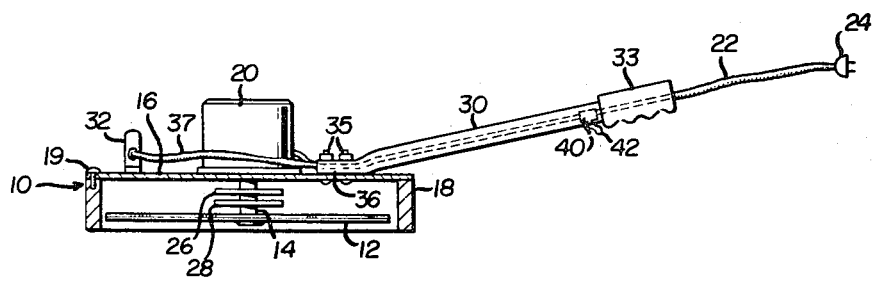
FIGURE 2 is a sectional view of the cutting apparatus.

The cutting apparatus shown in the drawings is a hedge trimmer which constitutes one embodiment of the invention. The trimmer includes a frame 10 in the form of a cup-shaped shell. Recessed inside of the frame 10 as shown in FIGURE 2, there is a cutting blade 12 which is mounted for rotation relative to the frame 10 and a shaft 14. The base plate 16 of frame 10 covers and protects the blade 12 on its upper side as viewed in FIGURE 2, and the circular side wall 18 of frame 10 covers and protects the tips of blade 12. The bottom side of frame 10 is open so that blade 12 has access to bushes or other objects to be cut. The base plate 16 may be attached to side wall 18 by screws 19 as shown, or the base plate and side wall may be welded together or even made integral.

Mounted on the top side of frame base 16 is an electrical motor 20. Shaft 14 is connected to motor 20 and is driven by the motor to rotate blade 12. A standard electrical cord 22 is connected to motor 20 and has a plug 24 to be inserted in a suitable electrical outlet for supplying energizing power to motor 20. Motor 20 is provided with a brake, such as brake disks 26 and 28, which automatically stop shaft 14 and blade 12 when motor 20 is shut off. Motors having such braking disks, or some other suitable form of brakes or clutch, are available commercially and so will not be described in detail.

Figure 3:
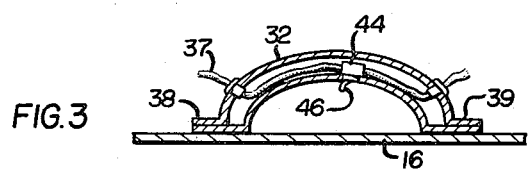
FIGURE 3 shows one handle with a switch mounted thereon.

Two handles 30 and 32 are affixed to base 16 of frame 10. Handle 30 is a tube having a grip 33 on the outer end thereof and having its other end 34 secured by bolts 35 to base 16. Cord 22 extends through handle 30 and has one lead 36 connected to motor 20 and another lead 37 extending through handle 32 and connected to motor 20. Handle 32 is also tubular so that lead 37 can pass through it as shown in FIGURE 3. Handle 32 is U-shaped, and its ends 38 and 39 may be welded to base 16 as shown. The trimmer can be lifted and manipulated by grasping handles 30 and 32, and the centered position of the handles permits the trimmer to be lifted without tilting it.

One electrical switch 40 is mounted inside tubular handle 30 next to grip 33, and a trigger type actuator 42 of switch 40 projects through handle 30 and is easily pulled by the operator as he grasps grip 33 to operate switch 40. Switch 40 may be connected in either of the leads 36 and 37 which are included in cord 40. Another electrical switch 44 is mounted inside handle 32 and connected in lead 37. An actuator 46 of switch 44 projects through handle 32 and can easily be pulled by an operator as he grips handle 32 to operate switch 44. Both switches 40 and 44 must be operated to start motor 20. Switches 40 and 44 may normally be open, and when actuators 42 and 46 are pulled as the operator grasps the handles, the switches are closed to complete the energizing circuit of the motor and thus allow the motor to operate to rotate blade 12. Actuators 42 and 46 may be spring biased so that they will return to their deactuated position when the handle portions 32 and 33 and the actuators are released, thus opening switches 40 and 44.

If the operator should accidentally drop one or both of the handle portions 32 and 33, one or both of the actuators 42 and 46 will return to its deactuated position, thus stopping motor 20. The brakes 26 and 28 will then automatically stop the cutting blade 12. Thus, there is very little chance for the operator to become injured by the blade 12 if the trimmer is partially or completely dropped.

Figure 4:
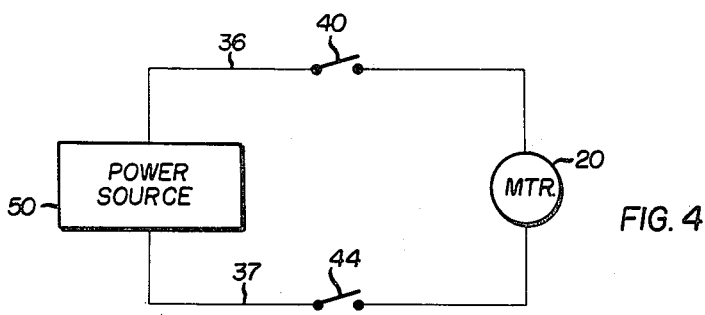
FIGURE 4 is a schematic diagram showing the handle mounted switches of the apparatus electrically connected between a power source and a motor of the apparatus.

FIGURE 4 is a simplified schematic diagram showing the switches 40 and 44 connected in series relationship with each other and the motor 20 and a power source 50. It is apparent that both switches must be closed in order to energize the motor 20, and if either or both of the switches are open, the motor will not be energized. This illustrates one suitable electrical connection for the switches 40 and 44, but it is to be understood that other connections for the switches are possible.

Thus, the invention provides a cutting device which can easily be manipulated for the purpose of trimming hedges or cutting other growth, the apparatus having a simple safety disconnect device which stops the motor and blade of the apparatus if either or both of the carrying handles are released. The rotary blade cuts growth into small pieces which can be used as mulch simply by raking the trimmings under the hedge. The trimmer cuts faster than other known trimmers for home use. It is easy to shape a hedge using the trimmer of the invention. Although the specific frame structure shown herein is merely an example, it does have the advantage that the side wall is screwed to the base for easy replacement and simple manufacture. The trimmer can be made light in weight so that it is not so tiring to use as known trimmers.

Having thus described my invention, I claim:

1. A hedge trimmer having a safety disconnect device and including in combination a housing, a rotary cutting blade, said housing having a cup-like configuration and enclosing said blade on the top and sides thereof while leaving a bottom opening through which said blade has access to bushes or the like for cutting purposes, an electric motor mounted on the top side of said housing centrally thereof and connected to said blade for driving said blade rotationally when said motor is energized, means connected to said motor for supplying energizing power thereto, first and second handles affixed to said housing to enable said housing and attachments thereto to be lifted and manipulated by an operator by grasping both of said handles, one with each hand, said first handle comprising a straight tubular rod affixed at one end thereof to the top side of said housing on one side of said motor and extending radially away therefrom, and said second handle comprising a U-shaped tubular member having both ends thereof affixed to the top side of said housing and located diametrically opposite said first handle on the other side of said motor, a first electrical switch mounted inside said first handle at the outward end thereof and having an actuator on the outside of said first handle in a position enabling the operator to grasp said first handle with one hand and operate the actuator of said first switch with the hand while so grasping said first handle, a second electrical switch mounted inside said second handle and having an actuator on the outside of said first handle in a position enabling the operator to grasp said second handle with the other hand and operate the actuator of said second switch, said actuators being biased to a deactuated position to which they return upon release thereof, and circuit means within said handles connecting said switches with said motor and said power supplying means and in series with each other so that both of said switches must be actuated in order to start said motor, whereby with power applied, when the operator grasps both of said handles and operates both of said actuators said motor is started, and if either of said actuators is released said motor is stopped.

References Cited

UNITED STATES PATENTS

| | | | |
|---|---|---|---|
| 1,193,490 | 8/1916 | Wood | 192—2 |
| 2,263,136 | 11/1941 | Knouse et al. | 143—43.1 |
| 2,985,992 | 5/1961 | Dowdle | 56—25.4 |
| 3,050,854 | 8/1962 | Becker et al. | 30—276 |
| 3,083,457 | 4/1963 | Ottosen et al. | 30—216 |
| 3,097,430 | 7/1963 | Lewinski et al. | 30—273 |
| 3,131,277 | 4/1964 | Brenzen | 200—157 |
| 3,142,950 | 8/1964 | West | 56—25.4 |

MYRON C. KRUSE, *Primary Examiner.*

U.S. Cl. X.R.

192—2; 200—157; 56—25.4; 30—123